US 9,424,461 B1

United States Patent
Yuan et al.

(10) Patent No.: US 9,424,461 B1
(45) Date of Patent: Aug. 23, 2016

(54) OBJECT RECOGNITION FOR THREE-DIMENSIONAL BODIES

(71) Applicant: Amazon Technologies, Inc., Reno, NV (US)

(72) Inventors: Chang Yuan, Seattle, WA (US); Geoffrey Scott Heller, Seattle, WA (US); Oleg Rybakov, Seattle, WA (US); Sharadh Ramaswamy, Sunnyvale, CA (US); Jim Oommen Thomas, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/929,672

(22) Filed: Jun. 27, 2013

(51) Int. Cl.
*G06K 9/00* (2006.01)
(52) U.S. Cl.
CPC .................................. *G06K 9/00201* (2013.01)
(58) Field of Classification Search
CPC .... G06K 9/3241; G06K 9/46; G06K 9/00536
See application file for complete search history.

(56) References Cited

U.S. PATENT DOCUMENTS

2008/0152231 A1*  6/2008  Gokturk et al. ............... 382/209

* cited by examiner

*Primary Examiner* — Bhavesh Mehta
*Assistant Examiner* — Ian Lemieux
(74) *Attorney, Agent, or Firm* — Polsinelli LLP

(57) ABSTRACT

Various embodiments utilize two-dimensional ("2D") and three-dimensional ("3D") object features for purposes such as object recognition and/or image matching. For example, a user can capture an image (e.g., still images or video) of an object and can receive information about items that are determined to match the object. For example, the image can be analyzed to detect visual features (e.g., corners, edges, etc.) of the object and the detected visual features can be combined to generate a combined visual feature vector which can be used for object recognition, image matching, or other such purposes. Other approaches utilize the image to generate a 3D model of the object represented in the image, which can be used to determine at least one object or types of objects that match the object represented in the image.

17 Claims, 12 Drawing Sheets

OBJECT RECOGNITION FOR THREE-DIMENSIONAL BODIES

BACKGROUND

Users are increasingly utilizing electronic devices to obtain various types of information. For example, a user wanting to obtain information about a book can capture an image of the cover of the book and upload that image to a book identification service for analysis. In many cases, the cover image will be matched against a set of two-dimensional images including views of objects from a particular orientation. While books are relatively easy to match, as a user will generally capture an image of the cover of the book with the cover relatively centered and upright in the image, other objects are not as straightforward. For example, an object such as a pair of boots might be imaged from several different orientations, with many of those orientations not matching the orientation of the stored image for that type or style of boot. Similarly, objects such as computers typically have images stored that show the computer with the screen in one orientation, which can have a significantly different shape than when computer screen is in a different orientation. Further, single two-dimensional images typically do not provide any information about dimension or scale, such that an image matching algorithm might not be able to determine the difference between a model airplane and the corresponding actual airplane. These differences in orientation, size, and shape, among other such differences, can prevent accurate matches from being located for various images captured by a user.

BRIEF DESCRIPTION OF THE DRAWINGS

Various embodiments in accordance with the present disclosure will be described with reference to the drawings, in which.

DETAILED DESCRIPTION

Figure 1A:
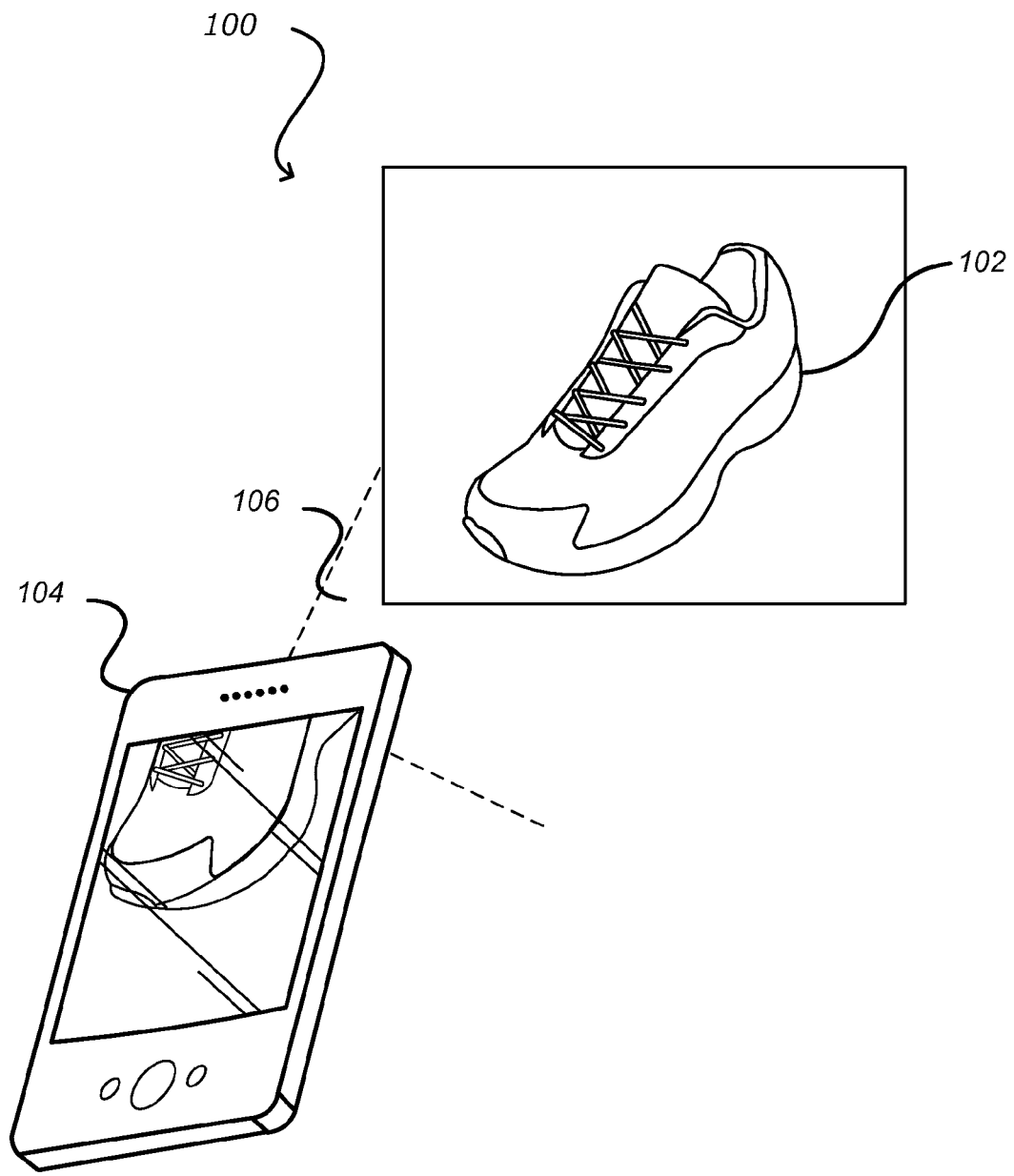
FIGS. 1(a), 1(b), 1(c), 1(d), 1(e), and 1(f) illustrate example images of objects that can be captured and analyzed in accordance with various embodiments.

Systems and methods in accordance with various embodiments of the present disclosure may overcome one or more of the aforementioned and other deficiencies experienced in conventional approaches to identifying various types of items or objects using an electronic device. In particular, various embodiments enable a user to capture image information (e.g., still images or video) about an object of interest and receive information about items that are determined to match that object based at least in part on the image information. For example, in at least some embodiments, an electronic device (e.g., a mobile phone, a tablet computer, etc.) can communicate with at least one image analysis service in order to attempt to identify objects in the captured image information (although in some embodiments at least a portion of the matching can be done on the computing device itself). The device can upload, stream, or otherwise transfer the image information (e.g., the captured image or data resulting from processing the image), either automatically or in response to user action, which can direct at least a portion of the image information to one or more image analysis services (or devices, or modules, etc.). Other types of data also can be supplied as well in some embodiments, as may include structured light data, three-dimensional image data, distance data, light field camera data, wavefront coding data, and the like. An image analysis service can include one or more algorithms for matching image information stored for a variety of objects. The image analysis service can aggregate the results from the image analysis service(s), and can provide information about the results as a set of matches or results to be displayed to a user in response to a visual search query. The image analysis service can also utilize one or more information aggregators or other such services that are capable of obtaining additional information for each of the results and provide that information to the user. The additional information can include, for example, descriptions, contact information, availability, location data, pricing information, and other such information.

Further, various embodiments can utilize two-dimensional ("2D") and three-dimensional ("3D") features for purposes of object recognition and/or image matching. For example, a user can capture 2D and/or 3D image information using an electronic device (e.g., a mobile phone, tablet computer, wearable computer, etc.). The image information can be analyzed to identify a plurality of feature points corresponding to at least one object, and based at least in part on the feature points, one or more visual feature vectors representative of the object can be generated. In accordance with various embodiments, the visual feature vectors typically corresponds to 2D image descriptors, 2D global image templates, 3D mesh models, or other similar visual features and can be thought of as descriptions of features of the object represented in the image. For example, the visual feature vectors can "describe" elementary characteristics such as the shape, the color, the texture, etc. of the object. Accordingly, a visual feature vector can be any "interesting" part of an image such as an edge, corner, or ridge of the object represented in the image. In accordance with an embodiment, edges can be points where there is a boundary (or an edge) between two image regions. Example edge detection algorithms include Canny, Sobel, Harris, SUSAN, among others. Corners can be point-like features in an image that have a two dimensional structure. Example corner detection algorithms include Shi & Tomasi, Level curve curvature, FAST, etc. Ridges can be a one-dimensional curve that represents an axis of symmetry.

In some situations, two or more visual feature vectors can be extracted at each image point, and at least a subset of the visual feature vectors can be combined (e.g., added, averaged, etc.) to generate a combined visual feature vector and the combined visual feature vector can be used for object recognition, image matching, or other such purposes. In accordance with various embodiments, depending on the number of visual feature vectors detected, the ensemble of visual features can vary. For example, in one situation, the analyzed image information can include feature corresponding to edges, corners, and contours. In another situation, the analyzed image information can include features corresponding to edges and corners. Accordingly, the combined visual feature is processed to remove a subset of the visual feature vectors to generate a compact visual feature vector. In other embodiments, the visual feature vectors can be arranged in a particular order. Further, the visual feature vectors can be assigned a weight, where the weight can be based at least in part on the usefulness of a particular feature in identifying an object represented in an image. For example, in the situation where less than a threshold amount of edge information is determined (e.g., a number of edges detected in an image is less than the threshold amount), but includes an adequate amount of contour information (e.g., a number of contours in the image at least meets a threshold amount), the visual feature vectors associated with the contour information can be weighted more that the visual feature vectors associated with the edge features. In some embodiments, the visual feature vectors can be ranked based at least in part on an associated weight, and visual feature vectors associated with a weight less than a threshold amount may be excluded from the combined visual feature vector. In this way, visual feature vectors determined to be the most useful can be used in the object recognition process. Accordingly, when reducing the combined visual feature vector, a compact combined visual feature vector can be generated. Further, various embodiments can prompt the user for additional information as necessary to attempt to narrow search categories for improve matching results for one or more objects in the captured image information. Embodiments also can allow for additional information to be captured and/or provided, such as by utilizing stereoscopic imaging with a stereo matching process, or by capturing and analyzing multiple frames using a multi-frame matching process. The compact combined visual feature vector can be compared to one or more stored vectors of a set of stored vectors, where each of the set of stored vectors corresponds to a respective type of object. A matching stored vector having a respective similarity score that at least meets a matching threshold can be determined, and based at least in part on the matching stored vector, at least one respective type of object represented in the image information can be identified.

Other approaches can be used as well for object recognition and/or image tracking. For example, the image information can be processed by the electronic device to generate a 3D model (e.g., a wire frame model) and a 2D representation of the object represented in the image information. The 3D model and the 2D representation of the object can be transmitted to a remote server. The remote server includes an object recognition, image matching, or other such image analysis service that can match the 3D model generated by the electronic device (also referred to as a device 3D model) to at least one 3D model of a set of 3D models accessible by the remote server (also referred to as simplifying 3D models), by comparing the device 3D model against at least a portion of the set of simplifying 3D models, including possible articulation configurations for each of the simplifying 3D models. For each comparison, saliency information describing the quality of each match can be determined and at least one simplifying model with a high degree of saliency (e.g., a saliency value above a predetermined threshold) can be determined. The server (or another such device) can then project or map the image information for the 2D representation of the object onto the device 3D model to produce at least one texture map for the device 3D model, and the texture map is projected onto the simplifying model that was determined to have a high degree of saliency. Using one or more image matching algorithms (e.g., SIFT-based matching algorithms), the texture map for the device 3D model is compared to texture maps associated with the simplifying model determined to have a high degree of saliency to determine one or more objects that match the object represented in the image information. Various other applications, processes, and uses are presented below with respect to the various embodiments.

Figure 1B:
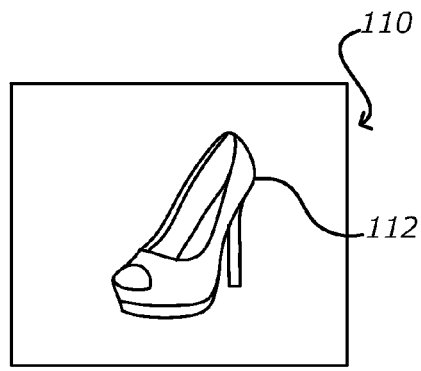

As described, users of computing devices (e.g., mobile phones, tablet computers, etc.) desire to point their device at an object and retrieve relevant information (e.g., pricing information, user reviews, links to purchase the object, etc.) associated with the object. FIGS. 1(a), 1(b), 1(c), 1(d), 1(e), and 1(f) illustrate example images of objects that can be captured and analyzed to retrieve relevant information in accordance with various embodiments. FIG. 1(a) illustrates an example image 100 of a shoe 102 that can be captured and utilized in accordance with various embodiments. In this example, a user is interested in obtaining information about the shoe. The shoe is shown with a particular orientation, as may be used by an electronic retailer or other such provider to display objects in an electronic marketplace. Such an orientation also can be used for matching, as the perspective view provides information about the general shape of the object, and shows the side and tongue of the shoe, which are likely places for any logo or distinctive markings. Using an appropriate application executing on a computing device 104, the user is able to obtain an image of the shoe by positioning the computing device such that the shoe is within a field of view 106 of at least one camera of the computing device. FIG. 1(b) illustrates another example image 110 showing a different shoe with substantially the same orientation. An image, feature, contour, or other such matching algorithm can analyze such an image and determine with relative certainty that shoes 102, 112 in the two images 100, 110 are not the same.

For example, an image analysis service could obtain and analyze multiple images of the shoe to be matched, which could include images taken from the top, bottom, each side, and various angles with respect to an object, as well as differently shaped states of the object (where possible). However, such an approach can greatly increase the amount of image processing, data storage, and image comparison that must be performed, and can be very time consuming, such that the approach can be at least impractical for many providers.

Figure 1C:
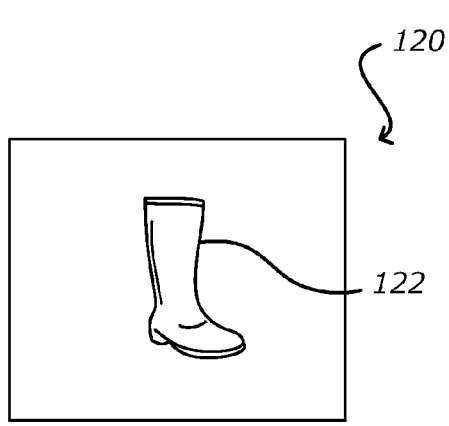
Figure 1D:
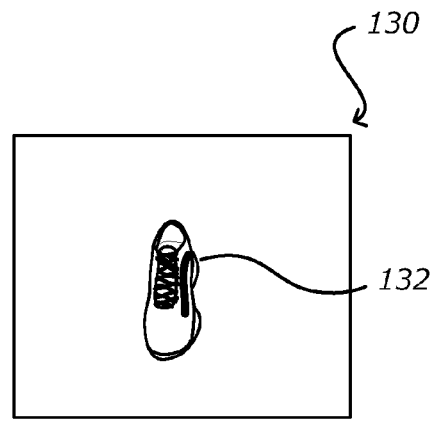
Figure 1E:
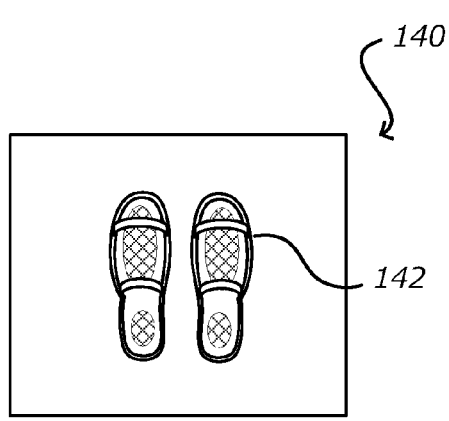
Figure 1F:
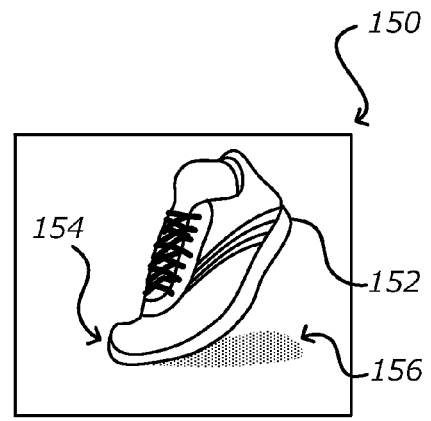
Figure 2:
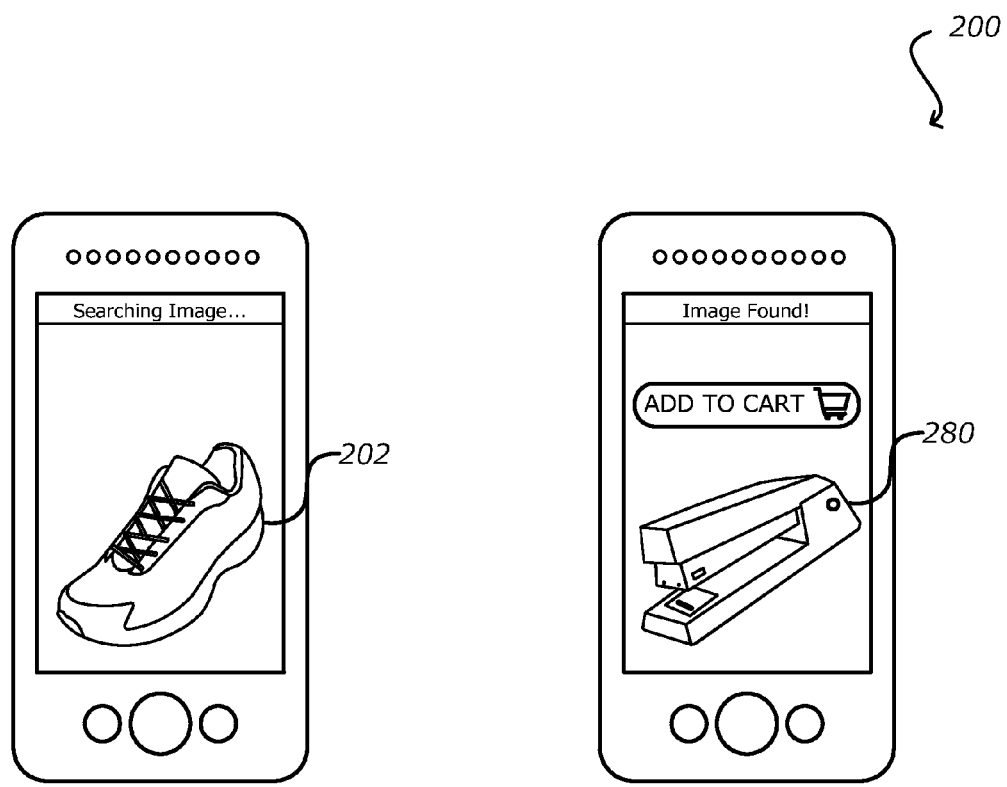
FIG. 2 illustrates an example situation of recognizing an object represented in an image.

In other instances, the image analysis service could attempt to analyze at least a portion of the image to determine a match to a corresponding shoe. In this situation, the portion of the image to be analyzed can be indicated manually, such as by a user pointing to the shoe on the screen or drawing a bounding box around the shoe. In other embodiments, one or more image analysis algorithms can attempt to automatically locate one or more objects in an image. In some embodiments, a user can manually cause the image to be analyzed, while in other embodiments the image can be analyzed automatically, either on the device or by transferring image information to a remote system or image analysis service as discussed later herein. Analyzing the image can include comparing the image to one or more images stored in an image database. However, various complications can arise, when users capture images from different orientations. For example, FIG. 1(c) illustrates an example image 120 of a boot 122 that can be captured in accordance with various embodiments. Even though a user might think the orientation is appropriate, unless the algorithm or image analysis service has a way to determine that the boot image is mirrored with respect to the normal orientation of FIG. 1(a), the algorithm might not be able to find a match even if there is matching information for that boot (or a similar boot). Further, the size of the boot can be significantly different than that of a shoe, such that a different scale image or distance might be needed for the matching, but the user would generally have no way of knowing this information. FIG. 1(d) shows another image 130 of a shoe 132 that can be captured in accordance with various embodiments. As can be seen, the orientation is significantly different than the standard orientation of FIG. 1(a). Due to the different orientation, a matching algorithm might not even be able to identify this object as a shoe, let alone determine the particular style. A user might be tempted to take such an image if the user sees a person wearing those shoes or sees them in a display window, without knowing that the matching algorithms may not be able to match objects from that orientation. A similar issue can arise with the shoes 142 of the image 140 of FIG. 1(e), in that there are two shoes taken from an orientation similar to how the user would actually wear the shoes. An algorithm might not be able to recognize either object as a shoe, and may or may not be able to determine that these are two related objects that correspond to a single item. A user might take such a view when attempting to locate information about the shoes the user is wearing, for example. Yet another issue is illustrated in FIG. 1(f). In this image 150, the shoe 152 is bent such that at least a portion 154 of the shoe has a different shape from a standard shape. Such variation can create difficulties with a matching process. Further, although algorithms can attempt to account for variations in lighting and other such factors, additional objects in the image such as shadows 156, stickers, writing, and the like can potentially affect the matching process by changing the determined shape, coloration, texture, or other such aspect of the object. Accordingly, the image analysis service may not recognize the object represented in the image and/or may return an incorrect matching, such as an image of stapler 280 when the user captured an image of a shoe 202, as shown example 200 in FIG. 2. Such an error can be frustrating to a user, who may then have to take additional steps to obtain relevant information about the object, such as a link or other information indicating where to purchase the object. Further, such an error can negatively affect the user's confidence in the quality of the image identification software, whereby the user attempts to use other such software to identify the object and obtain relevant information.

Accordingly, in accordance with various embodiments, one or more algorithms for determining information useful in identifying an object represented in an image can be used in approaches for object recognition, image matching, or other such purposes. Such information can include object descriptors and 2D and 3D representations of image information, among other visual features. The information can be compared to entries in a database in order to identify an object represented in the image. In various embodiments, certain combinations of the features are selected and compared to entries in the data. As described, depending on the number of visual features detected, the feature vector can one or more visual features Accordingly, the feature vector is an ensemble of a plurality of features. For example, in one situation, the analyzed image information can include features corresponding to edges, corners, and contours. In another situation, the analyzed image information can include features corresponding to edges and corners. In various embodiments, the visual features that make up the ensemble feature vector can be assigned a weight and the visual features can be ranked based at least in part on an associated weight. Visual features associated with a weight less than a threshold amount may not be included in the feature vector. In this way, features determined to be the most useful can be used in the object recognition process. Thereafter, the user can be presented with information about the object, such as a description of the object, where to purchase the object, a name of the object, physical characteristics associated with the object, pricing information associated with the object, history information, among others. Additionally or alternatively, the information can be provided to at least one of an electronic store application, a data retrieval application, or one or more applications (web or device) or services. The applications and/or services can reside on the device, or be in communication with such applications and/or services.

Figure 3:
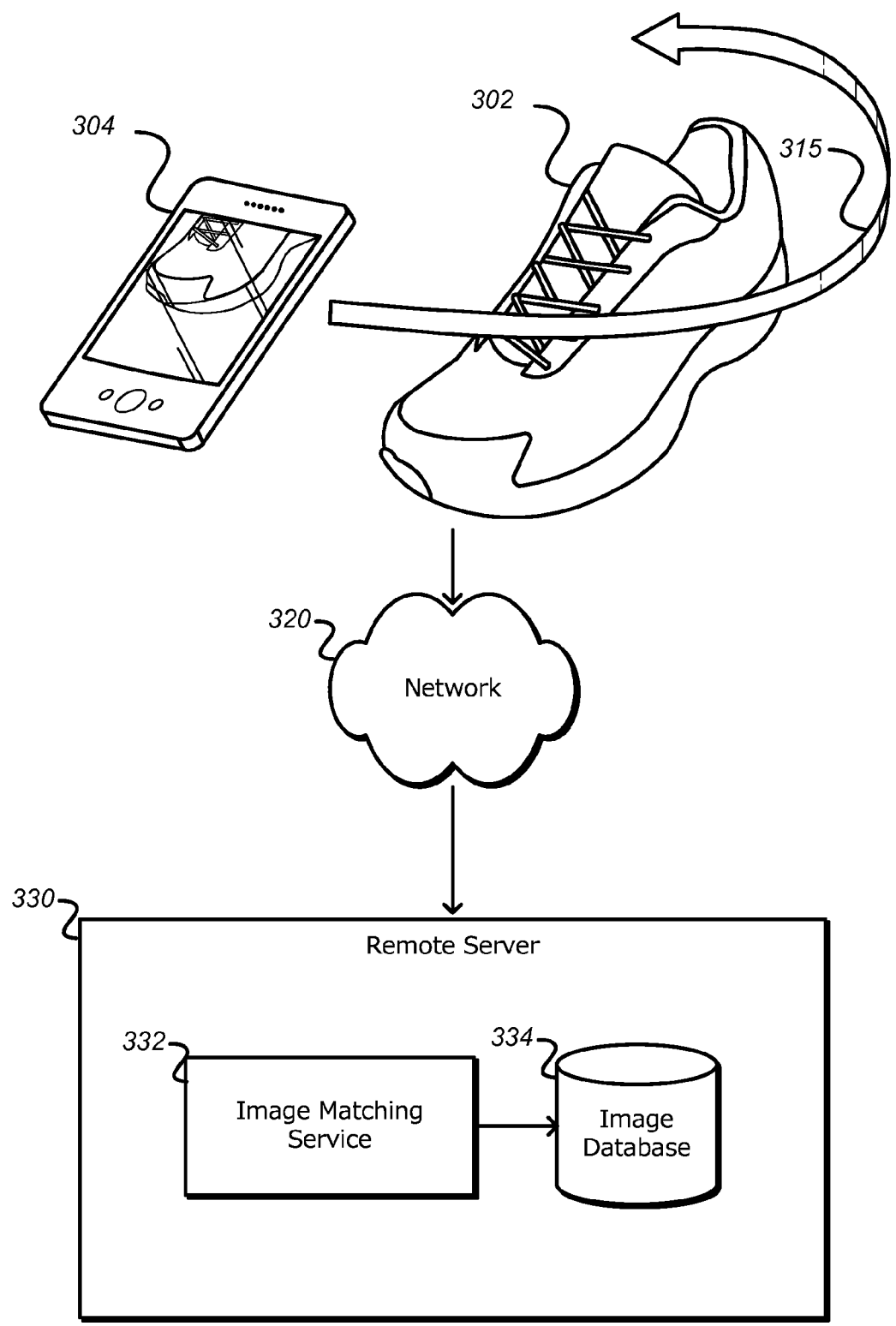
FIG. 3 illustrates an example environment in which aspects of the various embodiments can be utilized.

FIG. 3 illustrates an example environment in which various aspects of the embodiments can be utilized. As will be described further herein, various embodiments determine visual features (e.g., 2D and 3D image descriptors, among others) from user obtained images for purposes such as object recognition and/or image matching. The object recognition process can include an offline object intake process and an online process. During the offline object intake process, catalog objects (e.g., objects or items in an electronic store) are provided to a multi-modal visual sensor system. The system can compute visual feature information from the captured images, such as 2D images, 3D depth maps, 3D models, among other visual features. Multiple types of visual features can be extracted from the multi-modal single/multi-view images for an object and a set of visual features can be selected from multiple types of visual features to generate a combined visual feature vector. The feature vector can be converted into a compact feature vector and the compact feature vector can be added to the catalog database for use in object recognition and/or image matching.

During the online object recognition process, a user can capture one or more images of an object and an application on the user's device, or an image analysis service in communication with the user's device, can recognize the object represented in the images. For example, as shown in FIG. 3, a user is interested in obtaining information about a shoe, such as a price of the shoe, a description of the shoe, etc. Using an appropriate application executing on a computing device 304, the user is able to obtain images (or video) of the shoe 302 by positioning the computing device such that the shoe is within a field of view of one or more cameras on the computing device. It should be noted that although a shoe is shown, the object can be any object, including but not limited to monuments, buildings, consumer products, food items, and virtually any object with a uniquely recognizable geometry. It should be further noted that although a smart phone is shown, various other types of electronic or computing devices that are capable of determining and processing input can be used in accordance with various embodiments discussed herein. These devices can include, for example, tablet computers, notebook computers, desktop computers with a movable camera, personal data assistants, electronic book readers, video gaming controllers, and portable media players, among others.

In various embodiments, the one or more cameras on the computing device are capable of capturing 3D or stereoscopic images of the shoe. In order to generate a complete model, a user may capture images of the shoe from multiple angles around the shoe. This is represented by the motion arrow 315, where each hash mark, in one example, represents an angle location where a user may capture an image. Alternatively, the images could be captured in a stream of video with many image frames capturing images from incrementally small angle variation between adjacent frames. In some instances, this includes capturing images of the top, bottom, front, back, and both sides of the shoe, in this example, or a portion thereof. In other embodiments, 3D images can be acquired using a pair of stereoscopic cameras, structured light techniques, aperture coding techniques, time-of-flight techniques, among other well-known techniques for acquiring a 3D image.

The captured image(s) can be analyzed at the user's device or communicated over a network 320 to remote server 330 for analysis. The remote server can include an image analysis service 332 configured to analyze the image(s) to attempt to identify objects in the captured image(s). The image analysis service can be in communication with an image database, such as a catalog database of product images or other such images that can be used to match against the user captured image. The images in the database can be obtained during the offline object intake process while analysis of the captured user image can occur during the online object recognition process.

In accordance with an embodiment, the online object recognition process can include at least extracting visual features of the object on the user's device, selecting and converting the visual features into a compact feature vector on the user's device, and providing the feature vector to the image analysis service on the remote server. Alternatively, the image(s) captured from the user's device can be sent to the image analysis service and the service can perform the described steps. Thereafter, the image analysis service can generate a list of similar objects in the catalog database and send back to user's device information associated with a list of similar objects. The information can be displayed to the user on a display element of the user's device. For example, in accordance with an embodiment, the information can be displayed while simultaneously tracking the object in view; i.e., generating an augmented reality view or otherwise providing the information in another format.

As described, during the offline object intake process and the online object recognition process, one or more visual feature vectors can be extracted. In accordance with various embodiments, the visual feature vectors that can be extracted can include, for example, 2D local image descriptors, object contour shape segments, 2D global image descriptors, 3D triangular mesh based object models, object part based topological model, temporal features from video sequences, and other visual semantic information.

In accordance with an embodiment, extracting 2D local image descriptors can include determining image interest points using one or more interest point algorithms, such as FAST key points, Harris corners, and/or one or more interest region algorithms, such as a maximally stable extrema region extraction algorithm. For each image interest point, a local image descriptor is computed to capture the image appearance around the interest point using one or more local image descriptor algorithms, such as gradient magnitude/orientation histograms, shape context descriptors, etc.

In accordance with an embodiment, the object contour shape segments can be extracted as a set of internal and external contours based on connected image edges. Different segments from the contour can be extracted by analyzing their local shape characteristics (e.g., curvature) and by adaptive segmentation.

In accordance with an embodiment, 2D image global descriptors can be determined by computing a gradient map of the user obtained image and then generating a gradient orientation template of the whole object. In various other embodiments, the color histogram of the object area can be computed.

In accordance with an embodiment, 3D triangular mesh based object models can include at least a simplified 3D model, a catalog 3D model, and a device 3D model.

A simplified 3D model can include a scale-invariant 3D triangle mesh describing the general shape of an object. The model can include minimal detail and can exist as an optimization to reduce the search size when searching the catalog image database space. It should be noted that simplified 3D models do not themselves contain texture map information, but each specific catalog entry contains a unique texture map for its respective simplified 3D model.

A catalog 3D model can include a high-resolution 3D triangle mesh scan of an object made under controlled conditions and using professional equipment. The 3D triangle mesh can contain scale information, detailed texture maps, and is accurate for all possible viewpoints of the object. In addition to this information, the catalog 3D model can also include metadata describing the location, configuration and range of motion of the points of articulation in the catalog object. In accordance with an embodiment, the simplified 3D model and the 3D mesh based object model can be captured by multi-view stereo camera setup and computed by a multi-view stereo reconstruction process. Alternatively, the object model can be captured by or one/multiple moving cameras moving around the object.

The device 3D model can include a low-resolution 3D triangle mesh representation of one or more points of view of an object made by a customer using a mobile device. Device 3D models can be generated through the use of stereo cameras, structured light, scanning laser range finding, light field technology, or any other technology suitable for implementation on a mobile device. 3D reconstruction algorithms such as dense depth map estimation and registration and triangulation followed by bundle adjustment can be applied to generate the device 3D models. Similar to the catalog 3D model, the 3D triangle mesh contains scale information as well as detailed texture maps. Unlike the catalog 3D model, there is no metadata provided about the articulations in the target object.

It should be noted that the above mentioned visual features can be further organized into higher-level models to represent both the 2D and 3D topological structure of the object. One embodiment is to extract the local planar patches based on the feature descriptors and compute the spatial adjacency map between different local patches. Another embodiment is to create a stellar map representation of the object contour segments.

In accordance with an embodiment, temporal features from video sequences can include single-view and multi-view video sequences can be captured for the object. Additional features can be extracted from video sequences such as feature point trajectories captured by object tracking; relative depth/parallax info from the feature correspondences and/or optical flows; correlation between object patches which reflects how differently the object looks from multiple viewpoints.

In accordance with an embodiment, additional visual semantic information can include the detected text and detected logo as another set of image descriptors. Any detected texts/logos on the object can serve as features to reduce search space and make the system more robust. For example, by detecting the Lenovo logo and "ThinkVision" text on an object, the service can recognize a computer monitor. As another example, logo/text for "Poylcom" can be used to recognize a particular phone. This semantic information captures additional information not captured by the 2D local image descriptors.

As described, during the offline object intake process and the online object recognition process, the original set of visual features can be converted into a compact feature vector. Due to the complex nature of object shape and appearance, it is not known in advance what types of visual features can be computed from an object. For example, the offline catalog object intake process may generate all the possible features from both single view and multiple views, from multi-modal features and from a lengthy video sequence. The device side feature may be from just a single view and from a small number of video frames. Therefore, this initial set of features may be large. Accordingly, in accordance with an embodiment, a feature selection and conversion algorithm can be applied to generate a compact feature vector that is adapted to large-scale database search and can be used in object recognition process. For example, a distinctive score can be computed for each feature and only those features with a high distinctive score (e.g., a distinctive score above a predetermined distinctive score threshold) are used for object recognition. The distinctive score can be determined by one or more factors for each type of features, which can include image gradient magnitude of local image descriptors; curvature and length of object contour segments; sparseness of global object descriptors; number of vertices, triangles of the 3D mesh; connectedness of the object topological map, etc.

The selected features can be further converted into more compact forms for lower space and computation complexity. For example, one embodiment is to apply dimension reduction algorithms to each type of feature vector, such as principal component analysis (PCA), vector quantization (VQ), or other similar reduction algorithm. The shorter vectors can be furthered compressed into binary or integer hash tags, using techniques such as locality sensitive hashing (LSH). The compact vectors for each type of feature are concatenated into a compact combined vector that can be used to represent the object.

As described, during the offline object intake process, a catalog compact feature vector can be stored in the catalog database and can be used for object recognition. For example, the compact feature vector on the device can be transmitted to the image analysis service and can be compared to each compact feature vector (i.e., catalog compact feature vector) determined during the offline intake process. In many embodiments, the catalog objects possess a larger set of features than the device-captured objects. Accordingly, one embodiment of the visual feature database is to create a database per feature type. For example, a database can be created for 2D local image descriptors, for 2D global edge templates, for 3D object models, for temporal tracking related features, etc. Each database can be created with a proper data clustering structure and related algorithms. For features that are compatible with Euclidean distances, one can use a centroid-based clustering structure, such as hierarchical K-mean tree for efficient organization of feature vectors. For features that are likely to reside in a sparse set of areas within parameter space, a density based clustering scheme can be utilized to organize the features. In accordance with an embodiment, a new concatenated feature vector can be inserted to the databases by inserting each type of feature into the corresponding database. In this manner, all aspects of the object features can be recorded in the catalog database.

During a feature vector query process, matches can be determined for each sub-feature in the vector in the corresponding database. Thereafter, a list of matched objects can be generated by finding the shared matches among multiple lists. Another embodiment is to use one or more highly distinctive (e.g., one or more predetermined features) features to generate a list of potential matches and then compare the input feature vector to this much smaller list to select one with minimum distances between features. For example, the visible text or logo can be searched on the object and a small list of candidates can be obtained. Additional image descriptors such as general 2D local image descriptors can be extracted and matched within this list which can speed up the identification process. Another example is to use 2D image descriptors (either local image descriptors and/or global templates) to identify initial objects and then project or map the 3D mesh models of the candidate objects onto 2D images. The true matched object can be the object that leads to a highest similarity between the projected mesh in the 2D image and the extracted point/edge structure. Yet another embodiment of feature search can be to define a weighted sum function for the matching accuracy on different sub-features. For example, a function can be defined, weight_1*similarity(feature_1)+weight_2*similarity(feature_2)+weight_3*similarity(feature_3), where the weights can be manually defined or dynamically adjusted based on the real feature search process.

Another embodiment is to segment the 3D depth image into foreground and background areas of the scene, and then to extract external contour of the foreground object and compare it with database of objects contours. The segmented foreground/background map can be used to for better weight control: weight_1*similarity(feature_1)+weight_2*similarity(feature_2)+weight_3*similarity(feature_3), where the weight for depth image, defined as weight_1 in this case, is higher in the foreground area and lower in the background area.

Another embodiment is to classify the depth image into planar and non-planar objects and use this information for further weighted classification. In case of planar objects, the weight of image features can be higher than weight of 3D features. If the object has a non-planar structure, the weight of 3D features can be the same weight as the image features, where 3D features can include features which are extracted from depth image and image features can be features which are extracted from a RGB or YUV image.

Upon recognizing the object, the object information can be rendered on a display element of the user's device. For example, in accordance with an embodiment, image descriptors of the object can be overlaid onto the object. In one situation, the 3D mesh model can be projected or mapped onto the object based on the relative orientation between the object and the camera. Additionally, a rotating 3D mesh model can be rendered on the corner or some other location of the display screen. Other examples of displayed object information are described with reference to FIG. 4C.

As described, one or more algorithms can be utilized to extract and combine one or more different types of visual features (e.g., 2D local image descriptors, 2D global image template, 3D mesh model, etc.) identified in the captured images to generate a single feature vector utilized in object recognition, image matching, or other such purposes. As described, depending on the number of visual features detected, the feature vector can include one or more visual features. Accordingly, the feature vector is an ensemble of a plurality of features. In accordance with an additional approach, a number of mesh models at different levels of details and complexity can be used for object recognition and matching. Such approaches can be useful for 3D-shaped rigid and/or articulated objects. As used herein, 3D-shaped can refer to an object that contains multiple planar or non-planar surfaces. The object may not change its shape as a whole ("rigid") and/or each of its components is rigid itself and connected through a set of joints ("articulated"). In accordance with an embodiment, the approach of utilizing the mesh models can include at least an offline catalog object intake process and an online object recognition process, each further described in regard to FIGS. 4(*a*), 4(*b*), and 4(*c*).

Figure 4A:
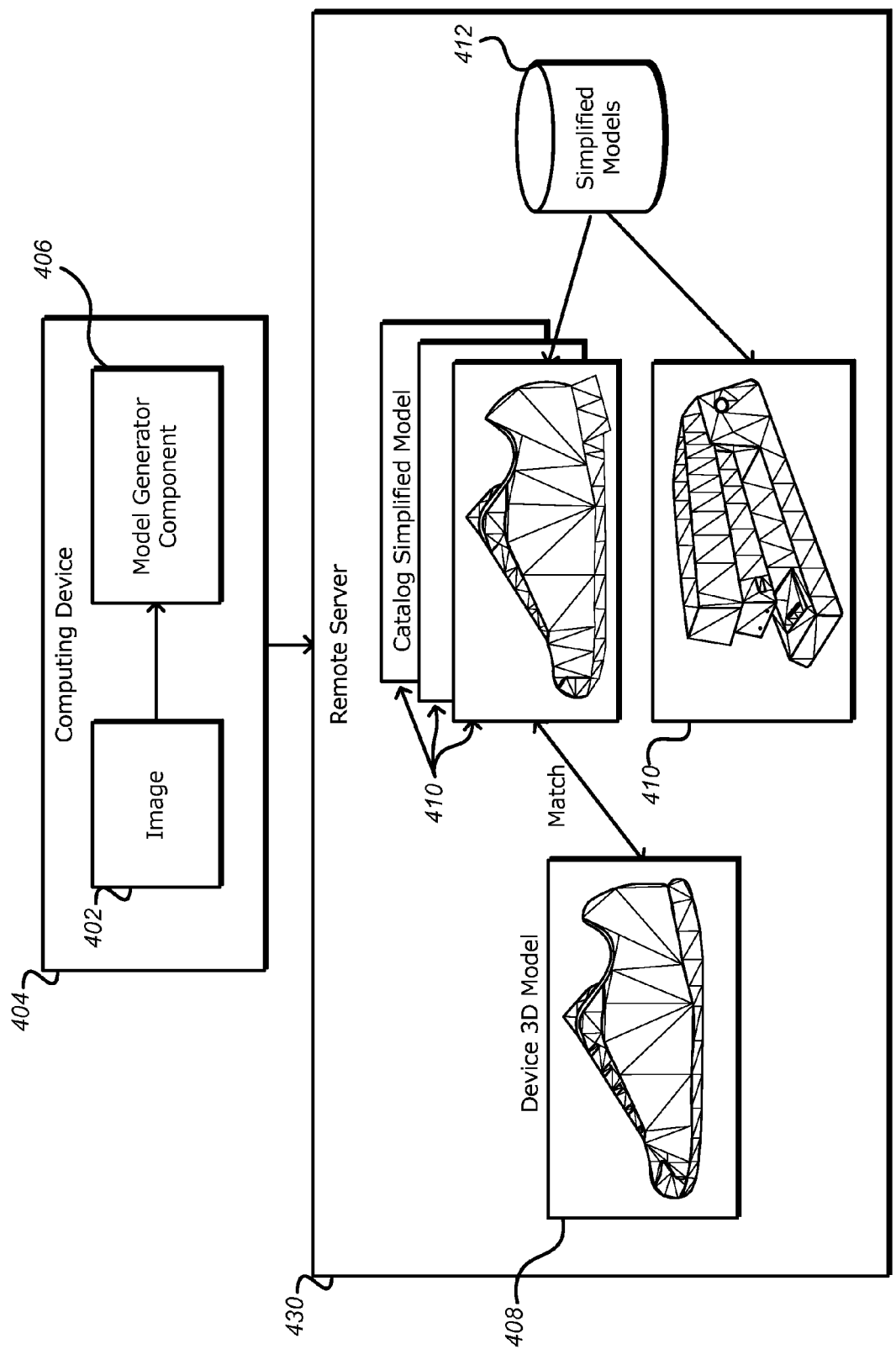
FIGS. 4(a), 4(b), and 4(c) illustrate an example system for identifying items and providing information about those items that can be utilized in accordance with various embodiments.
Figure 4B:
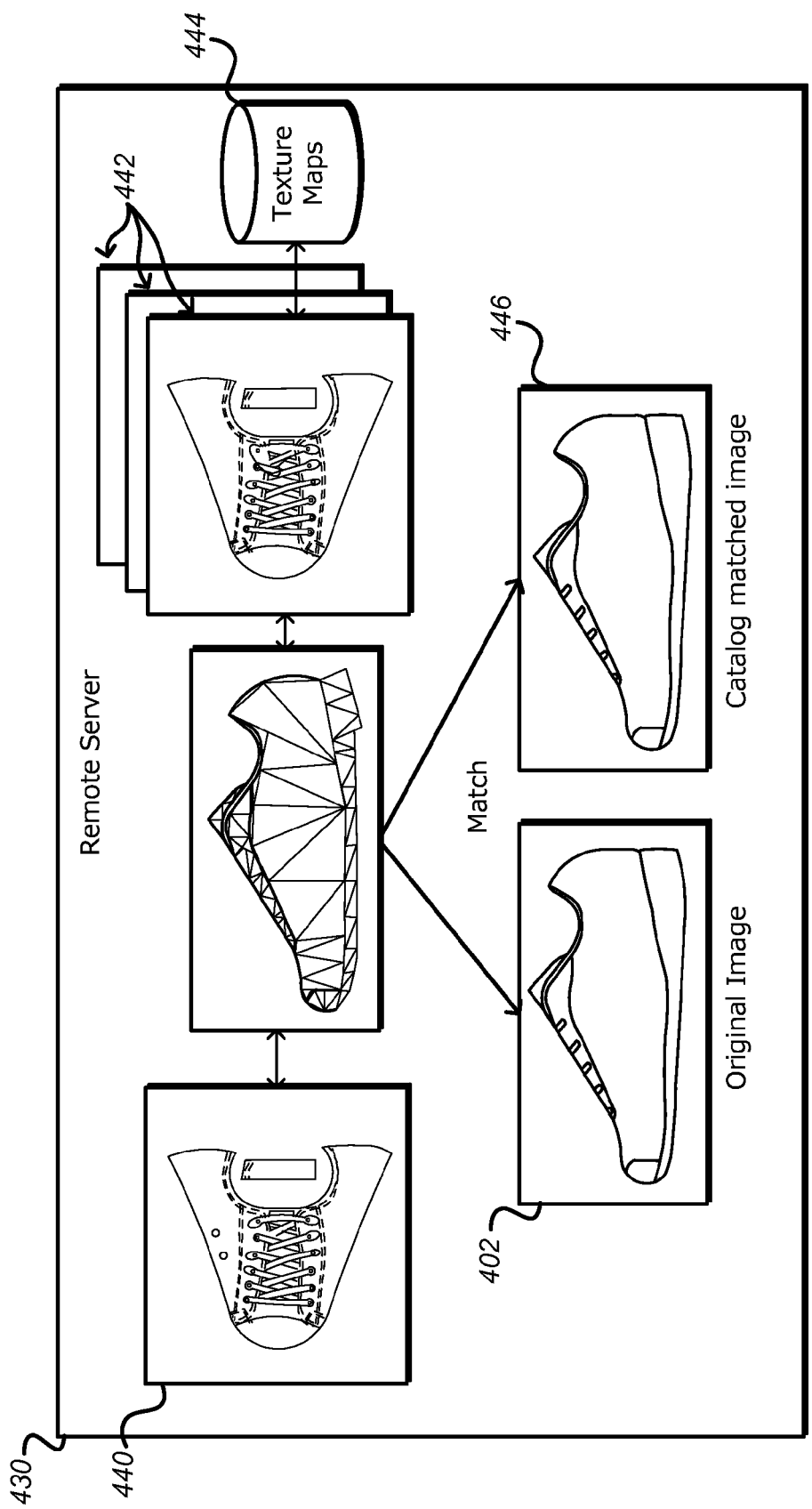
Figure 4C:

As illustrated in FIG. 4(*a*), during the online object recognition process, an image 402 of the target object can be obtained using one or more camera(s) of the user's device 404, and a model generator component of the device 406 can generate a 3D model and 2D image information that represents the object. In various embodiments, device 3D models can be generated through the use of stereo cameras, structured light, scanning laser range finding, light field technology, or any other technology suitable for implementation on a mobile device.

The device transmits the device 3D model and the 2D image information to a remote server 430. The remote server can include at least an object recognition, image matching, or other such image analysis service that can match the 3D model generated by the electronic device (herein referred to as a device 3D model) 408 to at least one 3D model of a set of 3D models (herein referred to as simplifying 3D models) 410 stored in a simplified model database 412 by comparing the device 3D model against at least a portion of the set of simplifying 3D models (including possible articulation configurations for each of the simplifying 3D models in the set of simplifying 3D models). For example, the image analysis service can attempt to match the device 3D model to one of the catalog simplified models of the set of simplifying 3D models by comparing the device 3D model against all possible articulation configurations of each catalog simplified model to produce saliency information describing the quality of each match. For simplifying 3D models with a high degree of saliency (e.g., a saliency value above a predetermined threshold), the image analysis service can produce alignment orientation information, which describes how the simplifying 3D model is oriented with respect to the device 3D model.

Upon determining at least one match, as illustrated in FIG. 4(*b*), the image analysis service projects or maps the 2D image information onto the device 3D model, producing a set of texture maps for the device 3D model. Using point source ray projection or other similar projection, for example, the texture map 440 for the device 3D model can be projected onto the simplifying 3D model(s) 442 that were found to have a high degree of saliency, each of which can be stored in a texture map database 444 or included in some other database. In accordance with various embodiments, the texture map 440 for the device 3D model can be project onto one or more generic simplifying models, such as a sphere, cube, cylinder, among others, instead of the determined catalog-based simplified model. Accordingly, in this example, the textures maps for the device 3D model and the texture maps for the catalog-based simplifying 3D model 444 can be projected or mapped onto the one of the generic simplifying models, and the mapping to the generic simplifying model can be used as the basis for matching.

Using SIFT-based image matching or other similar matching algorithms, the individual texture maps of the device-originated simplifying 3D model can be compared to the individual texture maps of the catalog-based simplifying 3D model 444. For example, SIFT-based image matching algorithms can be used to detect and describe features in each triangle mesh for a particular texture map. The detected features in each triangle mesh can be compared to the detected features in a corresponding triangle mesh. That is, a triangle mesh of the device-originated simplifying 3D model can be compared to a corresponding triangle mesh of the catalog-based simplifying 3D model, and saliency information can be computed for each triangle mesh texture. In some embodiments, due to the expected low quality of the device 3D Models, it may be necessary to create a number of candidate texture mappings that represent a search area and SIFT-based image matching can then be performed against this set of candidate texture mappings. In accordance with various embodiments, other matching algorithms that can be used include speeded up robust features (SURF), Canny edge detection, geometric hashing, and image gradients, among others.

The image analysis service can produce a set of object match candidates by selecting the catalog object 446 whose triangle mesh textures have the highest overall degree of saliency as measured by SIFT-based image matching or other image matching techniques. The image analysis service refines the list of object match candidates by using object scale information and returns matching object information to the device, along with metadata or other information about the object. As illustrated in FIG. 4(*c*), the device displays the matched object to user and in various embodiments, information associated with the object. The associated information can include any information related to an object, item, product, or other element that is matched (within at least a level of confidence) to the image information. The displayed information in this example includes the name of the located shoe, an image of the shoe (as captured by the user or otherwise obtained), pricing and description information, and review information. Also as shown are options to purchase the shoe. The type of information displayed (or otherwise conveyed) can depend at least in part upon the type of content located or matched. For example, a located shoe might include shoe type and additional images. For facial recognition, the information might include name, title, and contact information. It should be noted that images of any object, scene, person, or otherwise can be acquired, and information related to the subject of the acquired image can be provided. Examples situations in which such information can be provided include, but are not limited to, shopping, exploring, data collecting, where a user captures information about an object and is provided information related to the object; traveling, where a user captures an image of a monument, building, statute, landscape, etc. and is provided information related to the captured image, working, where a user captures an image of a part, component, or tool and is provided information related to the captured image; exploring, where a user captures an image of food, locations and is provided information related to the captured image, among others.

Various other types of information can be displayed as well within the scope of the various embodiments. As discussed, information such as that illustrated in FIG. 4(*c*) can be located by streaming (or otherwise transferring) an image, video, and/or other electronic data to a system or service operable to find one or more potential matches for that data and provide related information for those potential matches.

In accordance with various embodiments, to improve the quality of the matching, the user can scan the target object from multiple perspectives. In this situation, the user's device collects a set of device 3D model and associated 2D image information. Histograms, focus level, delta-time and other metrics are used to select frames that are of both high quality and are sufficiently different to warrant recording an additional set of 3D and 2D data. The user's device transmits the set of collected device 3D models and associated 2D image information to the server. The server produces a composite device 3D Model and associated composite texture map from the collection of 3D models as transmitted from the device. This composite device 3D model and associated composite texture map are then used in place of the single-perspective device 3D model in the above 3D object matching algorithm.

As described, catalog simplified models and associated texture maps can be used in the image matching/object identification process. Accordingly, an offline catalog object intake process is performed to generate one or more simplified models. Such a process can include generating, for each new catalog object that is either a single-piece rigid body, or is itself a collection of rigid bodies connected by one or more articulated joints, a high definition 3D scan of the object to create a triangle mesh of the catalog 3D model. This can be accomplished using, for example, any one of off-the-shelf 3D scanning product. Along with the 3D triangle mesh, images of the object are taken and can be used by the 3D scanning product to produce the texture map for the object. Using the catalog intake software tool, the catalog intake operator can identify the parts of the product that are articulated and can input the information about the range associated with each point of articulation. The catalog intake software tool matches the catalog 3D model to the set of simplifying 3D models, comparing against all possible articulation configurations, and produces saliency information describing the quality of each match. For simplifying 3D models with a high degree of saliency, the catalog intake software tool produces alignment orientation information, which describes how the simplifying 3D model is oriented with respect to the catalog 3D Model. Using point source ray projection, the texture maps for the catalog 3D model are projected onto the simplifying 3D model(s) that were found to have a high degree of saliency. The catalog 3D model and its respective texture maps, along with the simplifying 3D model and its respective texture maps are saved and stored in the object catalog and can be searched.

Figure 5:
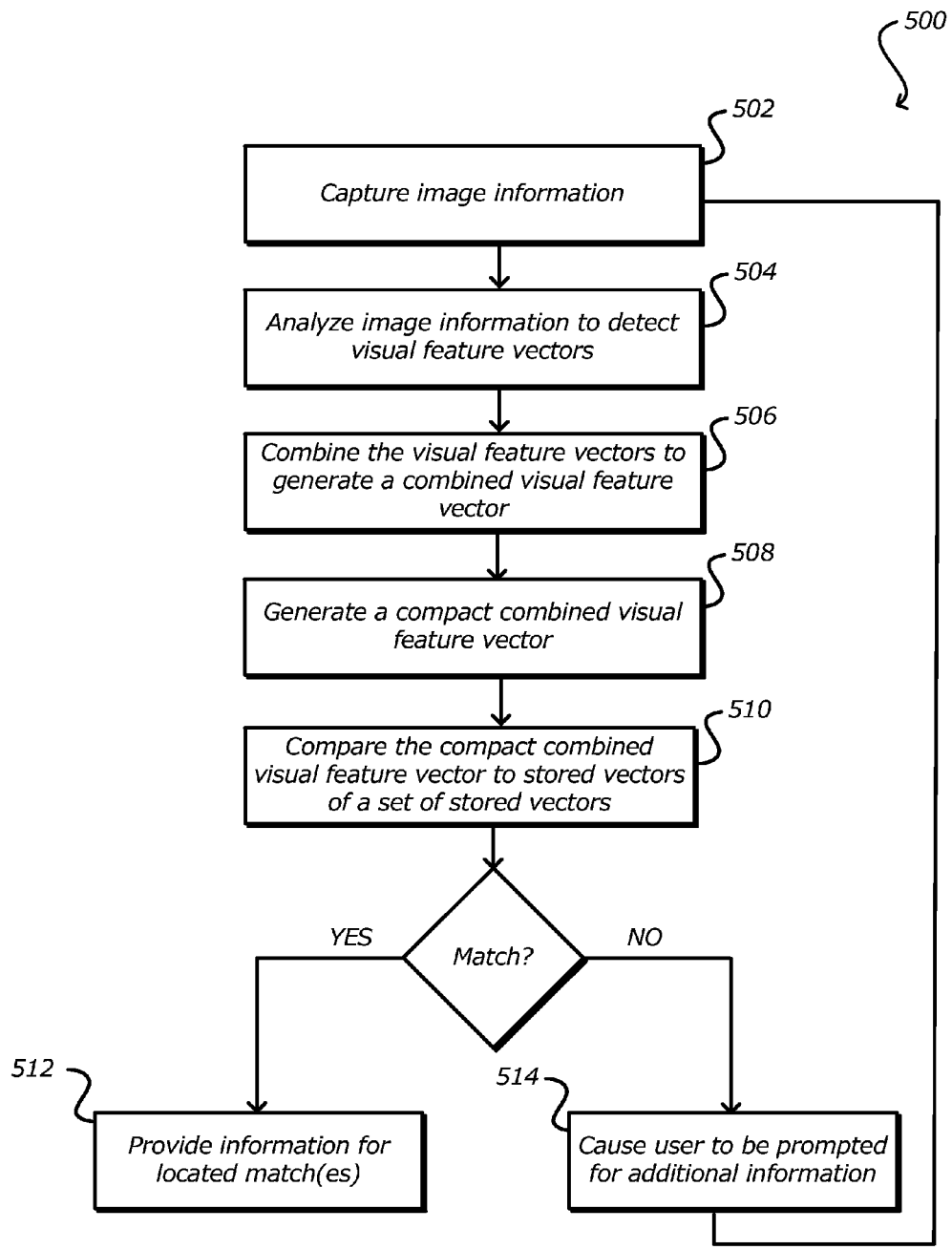
FIG. 5 illustrates an example process for locating matches for an object in captured image information that can be utilized that can be utilized in accordance with various embodiments.

FIG. 5 illustrates an example process 500 for identifying an object represented in an image in accordance with various embodiments. It should be understood that, for any process discussed herein, there can be additional, fewer, or alternative steps performed in similar or alternative orders, or in parallel, within the scope of the various embodiments unless otherwise stated. In this example, an object identification process or application is activated on a computing device. The identification process can be activated manually by a user, such as by the user opening an application, or automatically by the device in response to a detected motion, location, or other such trigger. In other embodiments, object identification might be active during various states of the device, such as an awake state, a standby state, and the like.

As discussed, an image can be captured manually or automatically, and the image can be analyzed on the device and/or on a remote system or service in communication with the device. An attempt can then be made to match the image, or data about the image, against stored images. As discussed, this can involve an image-to-image comparison, a histogram or feature vector comparison, comparing feature vectors, or any other such process known or used for image matching. For example, a user can capture 502 2D and/or 3D image information using an electronic device (e.g., a mobile phone, tablet computer, wearable computer, etc.) and the image information can be analyzed 504 to detect one or more visual feature vectors. For example, the image information can be analyzed to identify a plurality of feature points corresponding to at least one object represented in the image, and based at least in part on the feature points, one or more visual feature vectors representative of the object can be generated. In accordance with various embodiments, the visual feature vectors typically correspond to 2D local image descriptors, 2D global image templates, 3D mesh models, or other similar object descriptors. The detected visual feature vectors can be combined 506 (e.g., added, averaged, etc.) to generate a combined visual feature vector that includes a plurality of visual features. Combining visual feature vectors can include combining related vector representations. Further, the visual feature vectors can be combined using a dot product in order to generate the combined feature vector. It should be noted that any approach can be used to combine vectors having the same or differing dimensions.

In various embodiments, a feature selection and conversion algorithm can be performed to generate 508 a compact combined visual feature vector that is adapted to large-scale database search. For example, a distinctive score for each visual feature vector of the combined visual feature vector can be determined. One or more visual feature vectors associated with a distinctive score that meets or exceed at least a distinctive score threshold can then be identified, and the one or more visual feature vectors can be combined to generate a compact combined visual feature vector. In accordance with various embodiments, the selected features can be further converted into more compact forms for lower space and computation complexity. For example, in one approach, when generating the compact feature vector, a subset of the features (i.e., indispensable features) can be selected. Indispensable features can be any feature that is predominately detected in the image. This can include selecting features that are detected at least a threshold number of times. Features that are not selected can be removed from the final visual feature vector. In another approach, in order to reduce the dimensionality of the feature vector, a number of well-known algorithms can be used. One such algorithm includes using eigenspace projection (also called as Principal Component Analysis). In accordance with various embodiments, the shorter vectors (e.g., the vectors with less visual feature vectors) can be furthered compressed into binary or integer hash tags, using techniques such as locality sensitive hashing (LSH). The visual feature vector for each type of feature can be combined into to generate the compact combined visual feature vector that can be used to represent the object.

The device compact combined visual feature vector can be compared 510 to one or more stored vectors of a set of stored vectors, where each of the set of stored vectors corresponds to a respective type of object. For example, comparing the compact combined visual feature vector can include analyzing differences between the compact combined visual feature vector and the one or more stored vectors of a set of stored vectors to identify at least one representative type of object, wherein differences between the compact combined visual feature vector and the one or more stored vectors are less than a determined matching threshold. In various embodiments, the stored vectors can be determined during an offline intake process. As described, during the offline object intake process, a catalog compact feature vector is generated and stored in the catalog database, and represents or is at least associated with a catalog object. A stored vector having a respective similarity score that at least meets a matching threshold can be determined, and based at least in part on the matching stored vector, at least one respective type of object represented in the image can be identified. Thereafter, information about the match can be provided 512 to the user. For example, information about a type of object contained in the image can be transmitted for display on a display screen of the computing device. If at least one match cannot be found with an acceptable level of confidence or other such metric, or if the results otherwise do not meet some predetermined criteria, the device can be caused 514 to prompt the user for additional information, such as a category, sub-category, type, or other such information about the object, a distance, a location, or other such information that might be helpful in locating an appropriate match. For example, the user can be prompted for information that can help to narrow the context of the computer vision and/or reduce the search space. In some embodiments the user may be required to obtain additional image information such as by capturing an image of the object. The process can continue until an acceptable match is located and/or a user indicates that one of the suggested matches is sufficient. In at least some embodiments, the user will only be prompted for additional information up to a maximum number of times, in order to prevent a degrading of the user experience, etc. As discussed, information for related, similar, or suggested items or objects can be determined and presented as well.

As should be understood to one of ordinary skill in the art, the level of accuracy for a match can vary by category or type of item. For example, a user capturing an image of a compact disc might want information about that specific recording. A user capturing an image of a white t-shirt, however, might not care about the particular brand but may only want to obtain information about white t-shirts with similar attributes. Computer vision might not be able to provide information such as brand and size for a t-shirt being imaged, but such information may not be important to users in at least some cases. Thus, different matching criteria or thresholds might be used for different categories or types of item or object.

As discussed, such approaches can be used to identify various types of object, not just products or goods. For example, such a process can be used to identify animals, birds, statues, and people, among other such three-dimensional objects. For any situation where the matching utilizes images taken with a particular orientation, guiding the user to capture images with the proper orientation can improve the accuracy and speed of a matching and/or identification process. Further, such approaches can recognize aspects such as the subtle differences between various types of airline part, which can be difficult for humans to discern.

Figure 6:
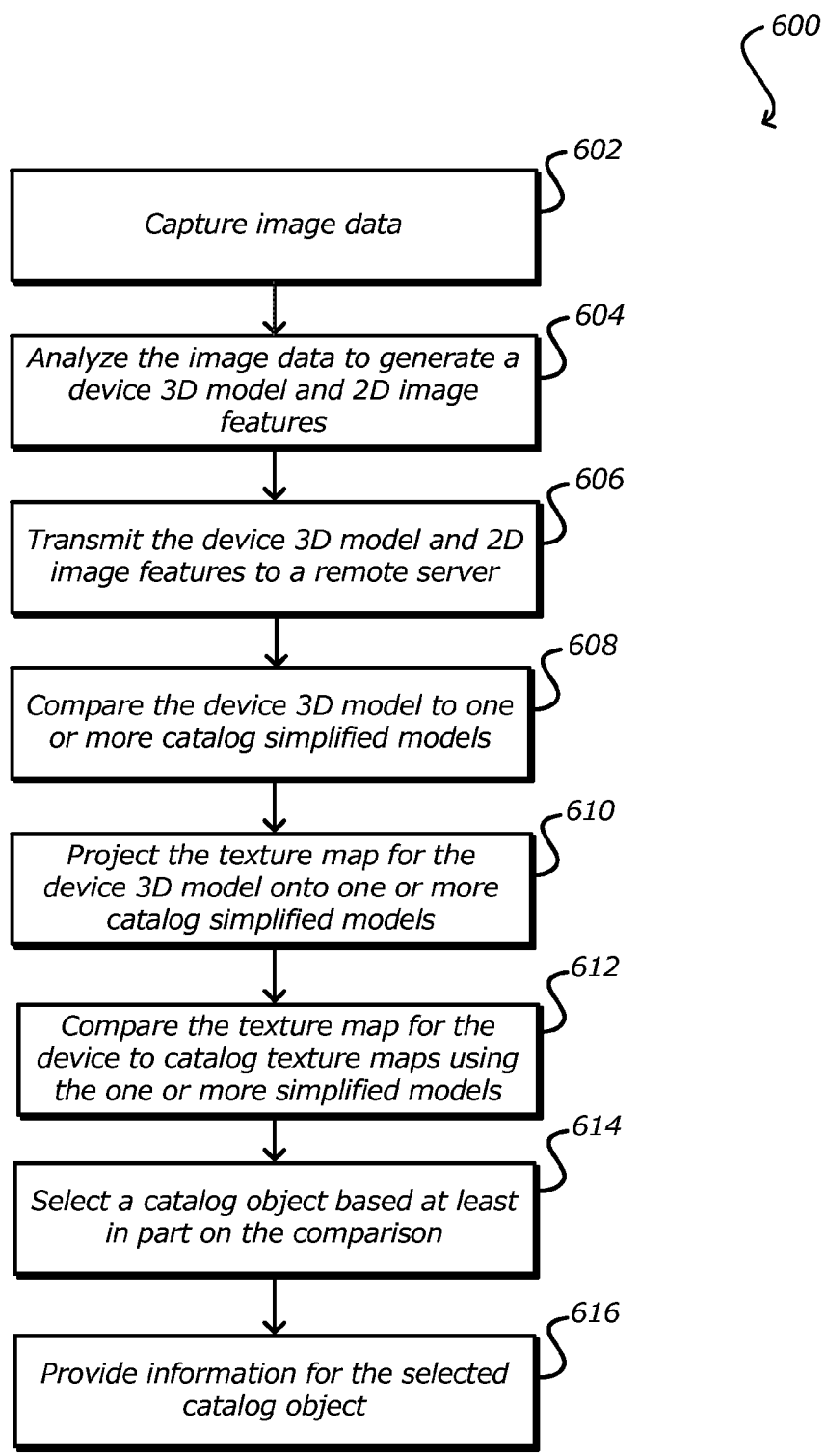
FIG. 6 illustrates an example process for locating matches for an object in captured image information that can be utilized that can be utilized in accordance with an alternate embodiment.

FIG. 6 illustrates another example process 600 for locating matches for object in captured image information that can be utilized in accordance with various embodiments. As described, one or more algorithms can be utilized to extract and combine one or more different types of visual features (e.g., 2D local image descriptors, 2D global image template, 3D mesh model, etc.) identified in the captured images to generate a feature vector useful for object recognition, image matching, or other such purposes. In accordance with an additional approach, a number of mesh models at different levels of details and complexity can be used for object recognition and matching. Such approaches can be useful for 3D-shaped rigid and/or articulated objects. As with the prior example, a user can capture 602 2D and/or 3D image information using an electronic device (e.g., a mobile phone, tablet computer, etc.). The image information can be analyzed 604 to generate a 3D model and 2D image information (such as 2D image features, e.g., edges, corners, etc.).

The device transmits 606 the device 3D model and the 2D image information to a remote server. The remote server includes at least an object recognition, image matching, or other such image analysis service that can match the 3D model generated by the electronic device (herein referred to as a device 3D model) to at least one 3D model of a set of 3D models (herein referred to as simplifying 3D models) stored in a simplified model database, by comparing the device 3D model against at least a portion of the set of simplifying 3D models (including possible articulation configurations for each of the simplifying 3D models in the set of simplifying 3D models). For example, the image analysis service can attempt to match the device 3D model to one of the catalog simplified models of the set of simplifying 3D models by comparing 608 the device 3D model against all possible articulation configurations of each catalog simplified model to produce saliency information describing the quality of each match. Such an approach can eliminate all non-shoe objects from matching consideration, and can further reduce the search space to a specific type of shoe. For simplifying 3D models with a high degree of saliency (e.g., a saliency value above a predetermined threshold), the image analysis service can produce alignment orientation information, which describes how the simplifying 3D model is oriented with respect to the device 3D model. The image analysis service can project the 2D image information onto the device 3D model to produce a set of texture maps for the device 3D model. Using point source ray projection or other similar projection, the texture map for the device 3D model is projected 610 onto the simplifying 3D model(s) that were found to have a high degree of saliency.

Using SIFT-based image matching or other similar 2D matching algorithms, the individual texture maps of the device-originated simplifying 3D model are compared 612 to the individual texture maps of the catalog-based simplifying 3D model, each of which can be stored in a texture map database or included in some other database. Saliency information is computed for each triangle mesh texture. The image analysis service produces a set of object match candidates by selecting 614 the catalog object whose triangle mesh textures have the highest overall degree of saliency as measured by SIFT-based image matching or other image matching techniques. In accordance with an embodiment, the image analysis service can refine the list of object match candidates by using object scale information and returns matching object information to the device, along with metadata or other information about the object. The image analysis service provides 616 the catalog object along with any associated information to the device, and the device can display the matched object to the user, and in various embodiments, the information associated with the object.

Figure 7:
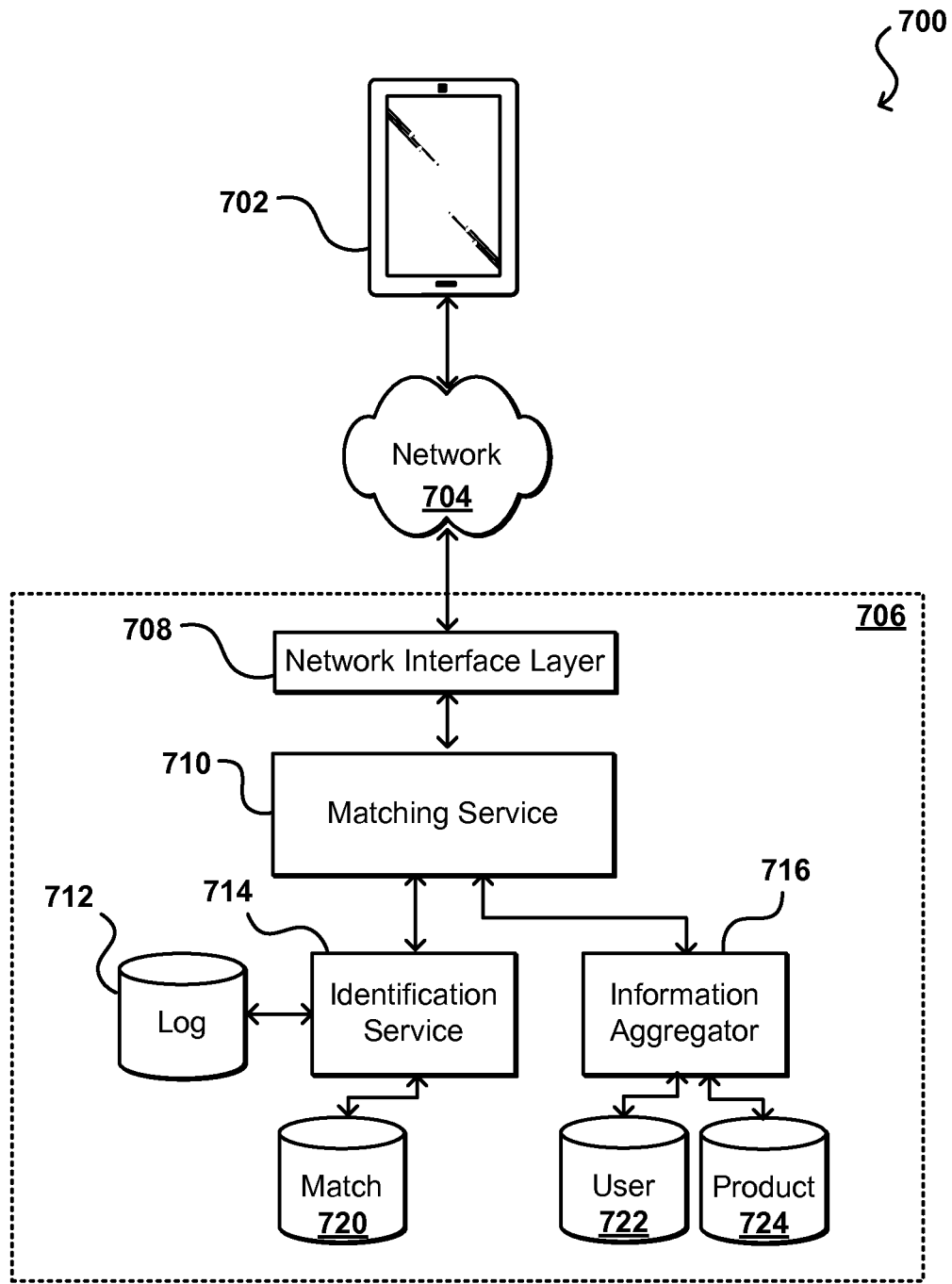
FIG. 7 illustrates example system for identifying items and providing information about those items that can be utilized in accordance with various embodiments.

FIG. 7 illustrates an example environment 700 in which information associated with the object can be located and transferred in accordance with various embodiments. In this example, a user is able to capture one or more types of information using at least one computing device 702. For example, a user can cause a device to capture image (or video) information, and can send at least a portion of that image (or video) information across at least one appropriate network 704 to attempt to obtain information for one or more objects, persons, or occurrences within a field of view of the device. The network 704 can be any appropriate network, such as may include the Internet, a local area network (LAN), a cellular network, and the like. The request can be sent to an appropriate content provider 706, as may provide one or more services, systems, or applications for processing such requests. The information can be sent by streaming or otherwise transmitting data as soon as it is obtained and/or ready for transmission, or can be sent in batches or through periodic communications. In some embodiments, the computing device can invoke a service when a sufficient amount of image information is obtained in order to obtain a set of results. In other embodiments, image information can be streamed or otherwise transmitted as quickly as possible in order to provide near real-time results to a user of the computing device.

In this example, the request is received to a network interface layer 708 of the content provider 706. The network interface layer can include any appropriate components known or used to receive requests from across a network, such as may include one or more application programming interfaces (APIs) or other such interfaces for receiving such requests. The network interface layer 708 might be owned and operated by the provider, or leveraged by the provider as part of a shared resource or "cloud" offering. The network interface layer can receive and analyze the request, and cause at least a portion of the information in the request to be directed to an appropriate system or service, such as an image analysis service 710 as illustrated in FIG. 7. An image analysis service in this example includes components operable to receive image information about an object, analyze the image information, and return information relating to people, products, places, or things that are determined to match objects in that image information.

The image analysis service 710 in this example can cause information to be sent to at least one identification service 714, device, system, or module that is operable to analyze the image information and attempt to locate one or more matches for objects reflected in the image information. In at least some embodiments, an identification service 714 will process the received data, such as to extract points of interest or unique features in a captured image, for example, then compare the processed data against data stored in a matching data store 720 or other such location. In other embodiments, the unique feature points, image histograms, or other such information as described in FIGS. 3 and 4 about an image can be generated on the device and uploaded to the image analysis service, such that the identification service can use the processed image information to perform the match without a separate image analysis and feature extraction process. Certain embodiments can support both options, among others. The data in an image matching data store 720 might be indexed and/or processed to facilitate with matching, as is known for such purposes. For example, the data store might include a set of histograms or feature vectors instead of a copy of the images to be used for matching, which can increase the speed and lower the processing requirements of the matching. Approaches for generating image information to use for image matching are well known in the art and as such will not be discussed herein in detail.

The image analysis service 710 can receive information from each contacted identification service 714 as to whether one or more matches could be found with at least a threshold level of confidence, for example, and can receive any appropriate information for a located potential match. The information from each identification service can be analyzed and/or processed by one or more applications of the image analysis service, such as to determine data useful in obtaining information for each of the potential matches to provide to the user. For example, an image analysis service might receive bar codes, product identifiers, or any other types of data from the identification service(s), and might process that data to be provided to a service such as an information aggregator service 716 that is capable of locating descriptions or other content related to the located potential matches.

In at least some embodiments, an information aggregator might be associated with an entity that provides an electronic marketplace, or otherwise provides items or content for consumption (e.g., purchase, rent, lease, or download) by various customers. Although products and electronic commerce are presented in this and other examples presented, it should be understood that these are merely examples and that approaches presented in the present disclosure can relate to any appropriate types of objects or information as discussed and suggested elsewhere herein. In such an instance, the information aggregator service 716 can utilize the aggregated data from the image analysis service 710 to attempt to locate products, in a product data store 724 or other such location, which are offered through the marketplace and that match, or are otherwise related to, the potential match information. For example, if the identification service identifies a book in the captured image or video data, the information aggregator can attempt to determine whether there are any versions of that book (physical or electronic) offered through the marketplace, or at least for which information is available through the marketplace. In at least some embodiments, the information aggregator can utilize one or more suggestion algorithms or other such approaches to attempt to determine related elements that might be of interest based on the determined matches, such as a movie or audio tape version of a book. In some embodiments, the information aggregator can return various types of data (or metadata) to the environmental information service, as may include title information, availability, reviews, and the like. For facial recognition applications, a data aggregator might instead be used that provides data from one or more social networking sites, professional data services, or other such entities. In other embodiments, the information aggregator might instead return information such as a product identifier, uniform resource locator (URL), or other such digital entity enabling a browser or other interface on the client device 702 to obtain information for one or more products, etc. The information aggregator can also utilize the aggregated data to obtain various other types of data as well. Information for located matches also can be stored in a user data store 722 of other such location, which can be used to assist in determining future potential matches or suggestions that might be of interest to the user. Various other types of information can be returned as well within the scope of the various embodiments.

The image analysis service 710 can bundle at least a portion of the information for the potential matches to send to the client as part of one or more messages or responses to the original request. In some embodiments, the information from the identification services might arrive at different times, as different types of information might take longer to analyze, etc. In these cases, the image analysis service might send multiple messages to the client device as the information becomes available. The potential matches located by the various identification services can be written to a log data store 712 or other such location in order to assist with future matches or suggestions, as well as to help rate a performance of a given identification service. As should be understood, each service can include one or more computing components, such as at least one server, as well as other components known for providing services, as may include one or more APIs, data storage, and other appropriate hardware and software components.

It should be understood that, although the identification services are shown to be part of the provider environment 706 in FIG. 7, that one or more of these identification services might be operated by third parties that offer these services to the provider. For example, an electronic retailer might offer an application that can be installed on a computing device for identifying music or movies for purchase. When a user transfers a video clip, for example, the provider could forward this information to a third party who has software that specializes in identifying objects from video clips. The provider could then match the results from the third party with items from the retailer's electronic catalog in order to return the intended results to the user as one or more digital entities, or references to something that exists in the digital world. In some embodiments, the third party identification service can be configured to return a digital entity for each match, which might be the same or a digital different digital entity than will be provided by the image analysis service to the client device 702.

As mentioned, however, the information used for image matching typically corresponds to an image of an object taken from a particular orientation. While image matching algorithms can attempt to account for a small amount of deviation in orientation, it will be unlikely that an image of a coffee table taken from the top will be able to match stored information for that coffee table where that information corresponds to an image taken from the side of the coffee table, as the unique features of the side of the table will generally not be present in a top view of the table. On the other hand, if a system is able to identify the table as a coffee table and determine information such as the type of wood or finish, as well as various styling or design information, there might be enough information present to at least determine a type of object and locate one or more similar items. Depending at least in part upon the user's intent, a similarity match might be desirable in at least some embodiments.

Figure 8:
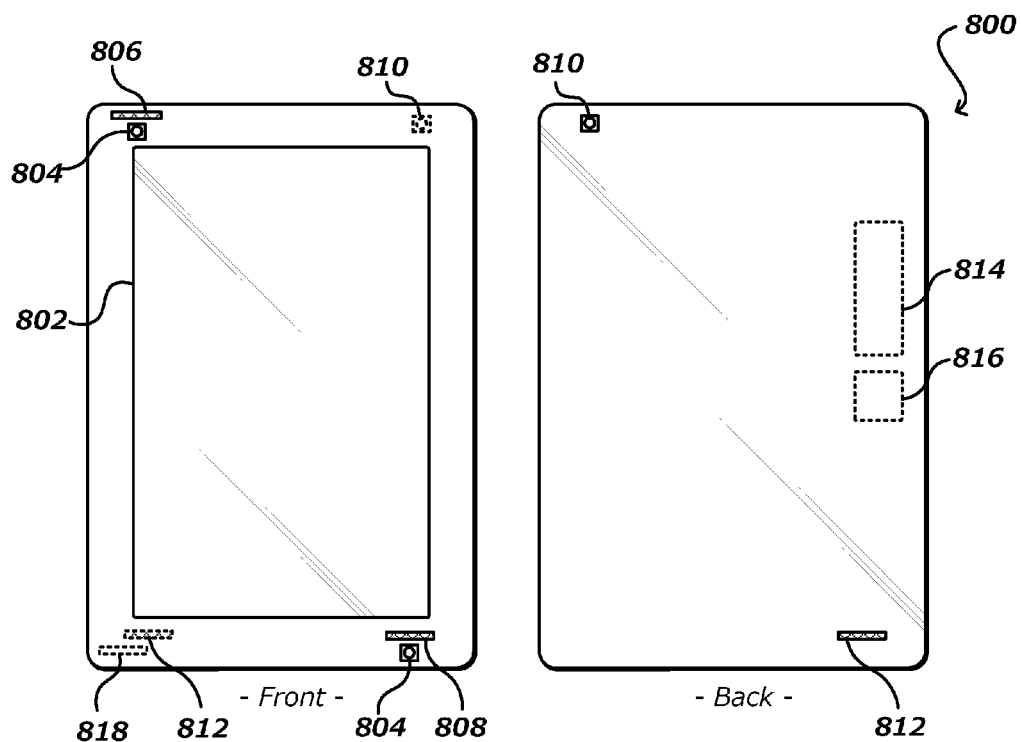
FIG. 8 illustrates an example device that can be used to implement aspects of the various embodiments.

FIG. 8 illustrates front and back views of an example electronic computing device 800 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 800 has a display screen 802 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 804 on the front of the device and at least one image capture element 810 on the back of the device. It should be understood, however, that image capture elements could also, or alternatively, be placed on the sides or corners of the device, and that there can be any appropriate number of capture elements of similar or different types. Each image capture element 804 and 810 may be, for example, a camera, a charge-coupled device (CCD), a motion detection sensor or an infrared sensor, or other image capturing technology.

As discussed, the device can use the images (e.g., still or video) captured from the imaging elements 804 and 810 to generate a three-dimensional simulation of the surrounding environment (e.g., a virtual reality of the surrounding environment for display on the display element of the device). Further, the device can utilize outputs from at least one of the image capture elements 804 and 810 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 808 on the front side, one microphone 812 on the back, and one microphone 806 on or near a top or side of the device. In some devices there may be only one microphone, while in other devices there might be at least one microphone on each side and/or corner of the device, or in other appropriate locations.

The device 800 in this example also includes one or more orientation- or position-determining elements 818 operable to provide information such as a position, direction, motion, or orientation of the device. These elements can include, for example, accelerometers, inertial sensors, electronic gyroscopes, and electronic compasses.

The example device also includes at least one communication mechanism 814, such as may include at least one wired or wireless component operable to communicate with one or more electronic devices. The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

Figure 9:
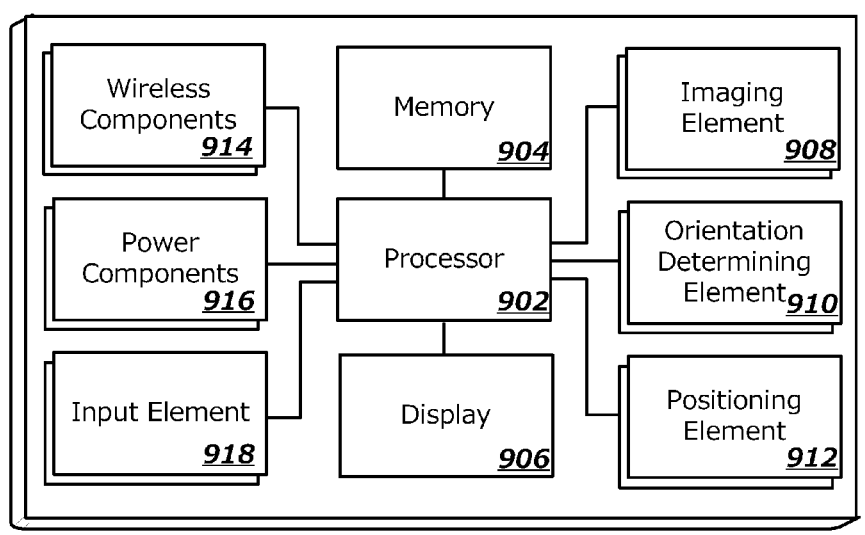
FIG. 9 illustrates example components of a client device such as that illustrated in FIG. 8.

FIG. 9 illustrates a set of basic components of an electronic computing device 900 such as the device 800 described with respect to FIG. 8. In this example, the device includes at least one processing unit 902 for executing instructions that can be stored in a memory device or element 904. As would be apparent to one of ordinary skill in the art, the device can include many types of memory, data storage, or computer-readable media, such as a first data storage for program instructions for execution by the processing unit(s) 902, the same or separate storage can be used for images or data, a removable memory can be available for sharing information with other devices, and any number of communication approaches can be available for sharing with other devices.

The device typically will include some type of display element 906, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 908, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 900 also includes at least one orientation determining element 910 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 900. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 912 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 914 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 918 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 10:
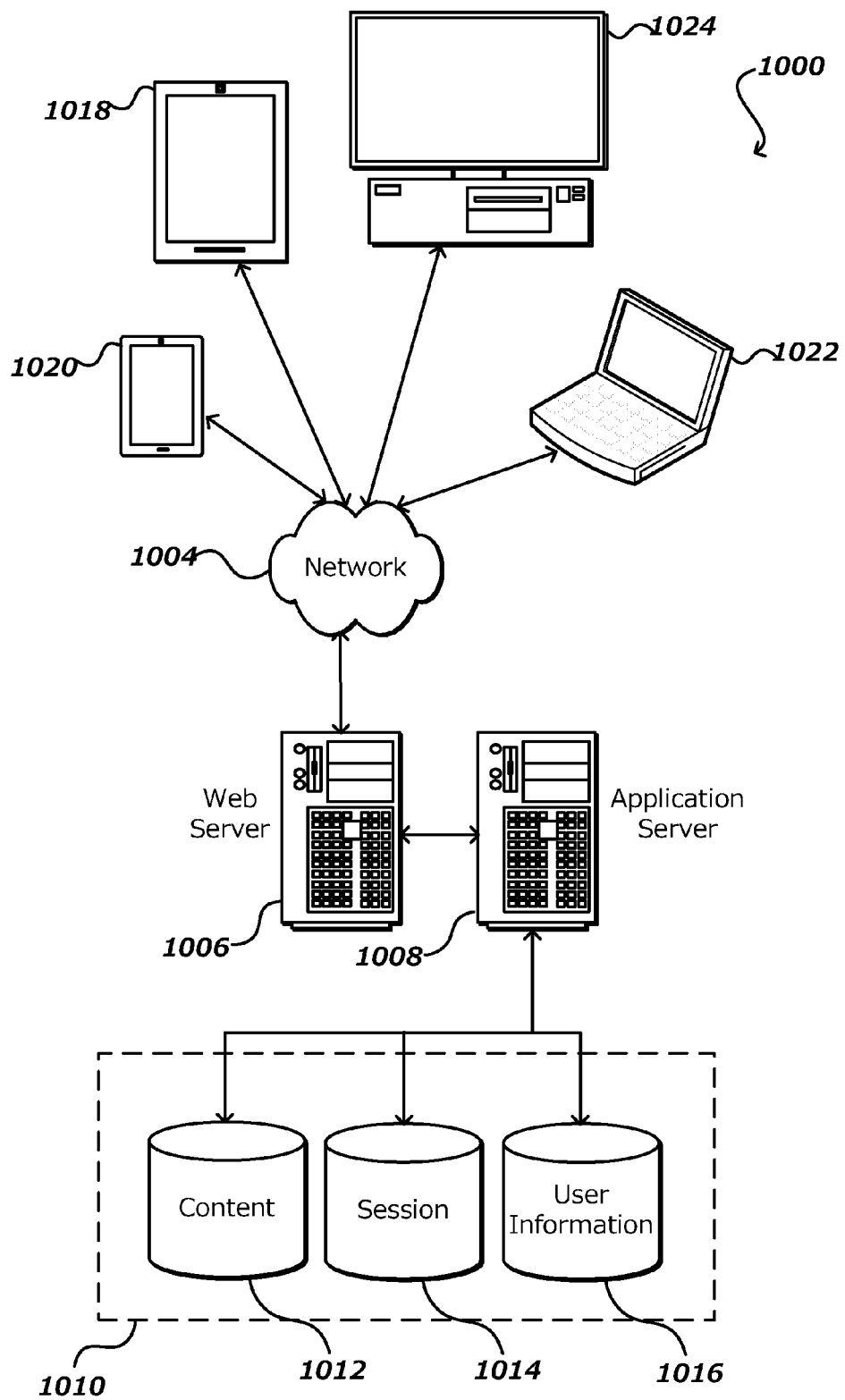
FIG. 10 illustrates an example of an environment for implementing aspects in accordance with various embodiments.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes electronic client devices 1018, 1020, 1022, and 1024, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client devices 1018, 1020, 1022, and 1024 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 1018, 1020, 1022 and 1024. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD)

or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer device, comprising:
   at least one processor;
   a camera; and
   memory including instructions that, when executed by the at least one processor, cause the computing device to:
      receive an image acquired by the camera, the image including a representation of an object;
      analyze the image to identify a plurality of feature points;
      generate, based at least in part upon the plurality of feature points, a plurality of visual feature vectors representative of the object;
      determine a distinctive score for each of the plurality of visual feature vectors, the distinctive score based at least in part on indispensable information that is useful in identifying the object, wherein the indispensable information represents frequently occurring features;
      select a subset of the plurality of visual feature vectors having a distinctive score equal or above a distinctive score threshold;
      generate a compact combined visual feature vector using the selected subset of the plurality of visual feature vectors;
      compare the compact combined visual feature vector to one or more stored vectors of a set of stored vectors, each of the set of stored vectors corresponding to a respective type of object;
      determine a matching stored vector having a respective similarity score that at least meets a matching threshold; and
      identify, based at least in part on the matching stored vector, at least one respective type of object represented in the image.

2. The computing device of claim 1, wherein the instructions, when executed to generate a compact combined visual feature vector include combining related vector representations.

3. The computing device of claim 1, wherein the instruction, when executed to compare the compact combined visual feature vector, further cause the computing device to:
   analyze differences between the compact combined visual feature vector and the one or more stored vectors of a set of stored vectors to identify at least one representative type of object, and wherein differences between the compact combined visual feature vector and the one or more stored vectors are less than a determined matching threshold.

4. A computer implemented method, comprising:
   receiving an image acquired by a camera of a computing device, the image including a representation of an object;
   determining a plurality of visual feature vectors representative of the object;
   generating a combined visual feature vector using at least a first subset of the plurality of visual feature vectors;
   determining a distinctive score for each visual feature vector of the first subset of the plurality of visual feature vectors, the distinctive score based at least in part on indispensable information that is useful in identifying the object, wherein the indispensable information represents frequently occurring features; and
      selecting a second subset of the plurality of visual feature vectors having the distinctive score above or equal to a distinctive score threshold; and
      generating a compact combined visual feature vector using the second subset of the plurality of visual feature vectors, wherein the compact combined visual feature vector is configured to identify at least one object type associated with the representation of the object.

5. The computer implemented method of claim 4, wherein selecting the second subset of the plurality of visual feature vectors includes at least one of removing a subset of the plurality of visual feature vectors, or rearranging an order of a subset of the plurality of visual feature vectors.

6. The computer implemented method of claim 4, further comprising:
   receiving a visual search query, wherein in response to the visual search query further performing:
   comparing the compact combined visual feature vector to one or more stored vectors of a set of stored vectors, each of the set of stored vectors corresponding to a respective type of object;
   determining a matching stored vector having a respective similarity score that at least meets a matching threshold; and
   identifying, based at least in part on the matching, at least one respective type of object represented in the image, the at least one respective type of object being associated with identifying information.

7. The computer implemented method of claim 6, further comprising:
   providing the identifying information to the computing device, wherein the identifying information includes at least one of a name of the at least one respective type of object, a description of physical characteristics associated with the at least one respective type of object, pricing information associated with the at least one respective type of object, history information associated with the at least one respective type of object, or a reference to one or more resources for information associated with the at least one respective type of object.

8. The computer implemented method of claim 6, wherein comparing the compact combined visual feature vector to one or more stored vectors further includes:
   analyzing differences between the compact combined visual feature vector and the one or more stored vectors of a set of stored vectors to identify at least one representative type of object, wherein differences between the compact combined visual feature vector and the one or more stored compact vectors are less than a determined matching threshold.

9. The computer implemented method of claim 6, wherein comparing the compact combined visual feature vector to one or more stored vectors further includes:
   identifying a subset of feature vectors of the compact combined visual feature vector;

matching the identified subset of feature vectors to one or more stored vectors of a set of stored features, each of the set of stored vectors corresponding to a respective type of object;

generating, based at least in part on the matching, a list of respective types of objects; and identifying corresponding respective types of objects between lists of types of objects.

10. The computer implemented method of claim 4, wherein the plurality of visual feature vectors includes at least one of an image descriptor or a three-dimensional model.

11. The computer implemented method of claim 4, wherein generating the compact combined visual feature vector includes combining at least a subset of related visual feature vectors.

12. The computer implemented method of claim 4, wherein determining the plurality of visual feature vectors includes using at least one of a Moravec corner detection algorithm, a Harris corner detection algorithm, a FAST corner detection algorithm a scale-invariant feature transform (SIFT) algorithm, a speeded up robust feature (SURF) algorithm, a gradient location and orientation histogram algorithm, a rotation-invariant feature transform (RIFT) algorithm, a Canny algorithm, or a local texture descriptor algorithm.

13. The computer implemented method of claim 4, further comprising adjusting an order of the second subset of the plurality of visual feature vectors based at least in part on the distinctive score associated with each visual feature vectors of the second subset of the plurality of visual feature vectors.

14. A computing device, comprising:
a processor;
a camera; and
memory including instructions that, when executed by the at least one processor, cause the computing device to:
receive an image captured by the camera, the image including a representation of an object;
determine a plurality of visual feature vectors representative of the object;
generate a combined visual feature vector using at least a first subset of the plurality of visual feature vectors;
determine a distinctive score associated with the first subset of the plurality of visual feature vectors, the distinctive score based at least in part on indispensable information that is useful in identifying the object, wherein the indispensable information represents frequently occurring features;
select a second subset of the plurality of visual feature vectors having the distinctive score above or equal to a distinctive score threshold; and
generate a compact combined visual feature vector using the second subset of the plurality of visual feature vectors, wherein the compact combined visual feature vector is configured to identify at least one object type associated with the representation of the object.

15. The computing device of claim 14, wherein selecting the second subset of the plurality of visual feature vectors includes at least one of removing a subset of the plurality of visual feature vectors, or rearranging an order of a subset of the plurality of visual feature vectors.

16. The computing device of claim 14, wherein the instruction, when executed, further causes the computing device to:
receive a visual search query, wherein in response to the visual search query further performing:
compare the compact combined visual feature vector to one or more stored vectors of a set of stored vectors, each of the set of stored vectors corresponding to a respective type of object;
determine a matching stored vector having a respective similarity score that at least meets a matching threshold; and
identify, based at least in part on the matching, at least one respective type of object represented in the image, the at least one respective type of object being associated with identifying information.

17. The computing device of claim 16, wherein the instruction, when executed, further causes the computing device to:
provide the identifying information to the computing device, wherein the identifying information includes at least one of a name of the at least one respective type of object, a description of physical characteristics associated with the at least one respective type of object, pricing information associated with the at least one respective type of object, history information associated with the at least one respective type of object, or a reference to one or more resources for information associated with the at least one respective type of object.

* * * * *